United States Patent
Huang et al.

(10) Patent No.: US 11,882,825 B2
(45) Date of Patent: Jan. 30, 2024

(54) HERBICIDE SAFENER

(71) Applicant: CH BIOTECH R&D CO., LTD., Nantou (TW)

(72) Inventors: Ya-Wen Huang, Nantou (TW); Cho-Chun Huang, Nantou (TW); Gui-Jun Li, Nantou (TW); Kai Xia, Nantou (TW)

(73) Assignee: CH BIOTECH R&D CO., LTD., Nantou (TW)

( * ) Notice: Subject to any disclaimer, the term of this patent is extended or adjusted under 35 U.S.C. 154(b) by 146 days.

(21) Appl. No.: 17/323,211

(22) Filed: May 18, 2021

(65) Prior Publication Data

US 2021/0352893 A1    Nov. 18, 2021

(30) Foreign Application Priority Data

May 18, 2020   (TW) ................. 109116420

(51) Int. Cl.
| | |
|---|---|
| *A01N 25/32* | (2006.01) |
| *A01N 25/30* | (2006.01) |
| *A01N 43/36* | (2006.01) |
| *A01N 37/44* | (2006.01) |

(52) U.S. Cl.
CPC ............ *A01N 25/32* (2013.01); *A01N 25/30* (2013.01); *A01N 37/44* (2013.01); *A01N 43/36* (2013.01)

(58) Field of Classification Search
CPC ........ A01N 25/30; A01N 25/32; A01N 37/44; A01N 43/36; A01N 37/40; A01N 39/04; A01N 47/36; A01N 57/20; A01P 13/00
See application file for complete search history.

(56) References Cited

U.S. PATENT DOCUMENTS

| | | | |
|---|---|---|---|
| 2004/0209777 A1* | 10/2004 | Gemma et al. ........ | A01N 43/36 504/283 |
| 2007/0286909 A1* | 12/2007 | Smith .................. | A61K 31/525 514/564 |
| 2020/0008364 A1* | 1/2020 | Ohno et al. | |

FOREIGN PATENT DOCUMENTS

| | | | | |
|---|---|---|---|---|
| CN | 103910574 A | * | 7/2014 | ............... C05G 3/00 |
| DE | 3 064 062 A1 | * | 9/2016 | ............. A01N 25/02 |

OTHER PUBLICATIONS

Wang et al. CN103910574A Jul. 9, 2014 translated Espacenet (Year: 2023).*

(Continued)

*Primary Examiner* — Kevin S Orwig
*Assistant Examiner* — K. Ketcham
(74) *Attorney, Agent, or Firm* — Locke Lord LLP; Tim Tingkang Xia, Esq.

(57) ABSTRACT

The disclosure describes a concentrate and a ready to use herbicide safener including 1-10 mg/L of glutamic acid, 10-100 mg/L of proline, and 50-200 mg/L of γ-Aminobutyric acid (GABA). The disclosure also concerns a method for protecting plants from herbicides. The method includes a step of applying a ready to use herbicide safener disclosed in the disclosure to a plant.

8 Claims, 11 Drawing Sheets

(56) References Cited

OTHER PUBLICATIONS

Bukovac et al. "Induction of Parthenocarpic Fruit Growth in Sour Cherry with N-substituted Phthalimide and NAA," HortScience, vol. 20(6):1083-1085. 1985. Pertinent page(s): p. 1084, first paragraph (Year: 1985).*
Bulksupplements.com ingredients and reviews (pp. 1-2) https://www.bulksupplements.com/products/l-glutamic-acid-powder https://www.bulksupplements.com/products/l-proline (Year: 2020).*
OstroVit GABA (pp. 1-2) https://ostrovit.com/en/products/ostrovit-supreme-pure-gaba-200-g-21145.html (Year: 2019).*

* cited by examiner

:::page
HERBICIDE SAFENER

CROSS REFERENCE TO RELATED APPLICATION

This application claims the benefits of Taiwan application Serial No. 109116420, filed on May 18, 2020, the disclosures of which are incorporated by references herein in its entirety.

BACKGROUND OF THE INVENTION

1. Field of the Invention

The present invention relates to an herbicide safener. More particularly, the present invention relates to an herbicide safener including glutamic acid, proline, and gamma aminobutyric acid (GABA).

2. Description of the Prior Art

Weeds are one of the main limiting factors for crop production. Weeds decrease yields, increase production costs, interfere with harvest, and lower product quality. Weeds also impede irrigation water-flow, interfere with pesticide application, and harbor disease organisms. Therefore, weed control is vital to agriculture.

The use of herbicides is the most effective and economical way to control weeds. Although herbicides are designed to kill unwanted weeds and leaves the desired crop unharmed, crops may be damaged by herbicide due to misapplication, spray drift, vapor drift, contamination (spray tank, measuring containers, fertilizer, etc.), and carryover in soil, mulch, hay, etc. Injury symptoms caused by herbicides includes general and interveinal chlorosis, mottled chlorosis, yellow spotting, purpling of the leaves, necrosis, stem dieback, shoot and petiole twisting, leaf cupping, stunting, curling, strapping, feathering, roughness, crinkling of the leaf surface, fingering of the leaf margins, stem elongation, and spindly growth. In order to reduce the damage caused by herbicides to crops, the present invention provides an herbicide safener.

SUMMARY OF THE INVENTION

In one aspect, the present invention relates to a concentrate herbicide safener, comprising between about 0.1 to about 5 g/L glutamic acid, between about 1 to about 50 g/L proline, and between about 4 to about 100 g/L gamma aminobutyric acid (GABA).

In another aspect, the present invention relates to a ready to use herbicide safener, comprising between about 0.5 to about 25 mg/L glutamic acid, between about 5 to about 250 mg/L proline, and between about 20 to about 500 mg/L gamma aminobutyric acid (GABA).

In another aspect, the present invention relates to a method for protecting a plant from damages caused by herbicides, comprising a step of applying a ready to use herbicide safener to the plant, and the ready to use herbicide safener comprising between about 0.5 to about 25 mg/L glutamic acid, between about 5 to about 250 mg/L proline, and between about 20 to about 500 mg/L gamma aminobutyric acid (GABA).

The present invention is illustrated but not limited by the following embodiments and drawings.

DETAILED DESCRIPTION OF THE PREFERRED EMBODIMENT

Figure 1:
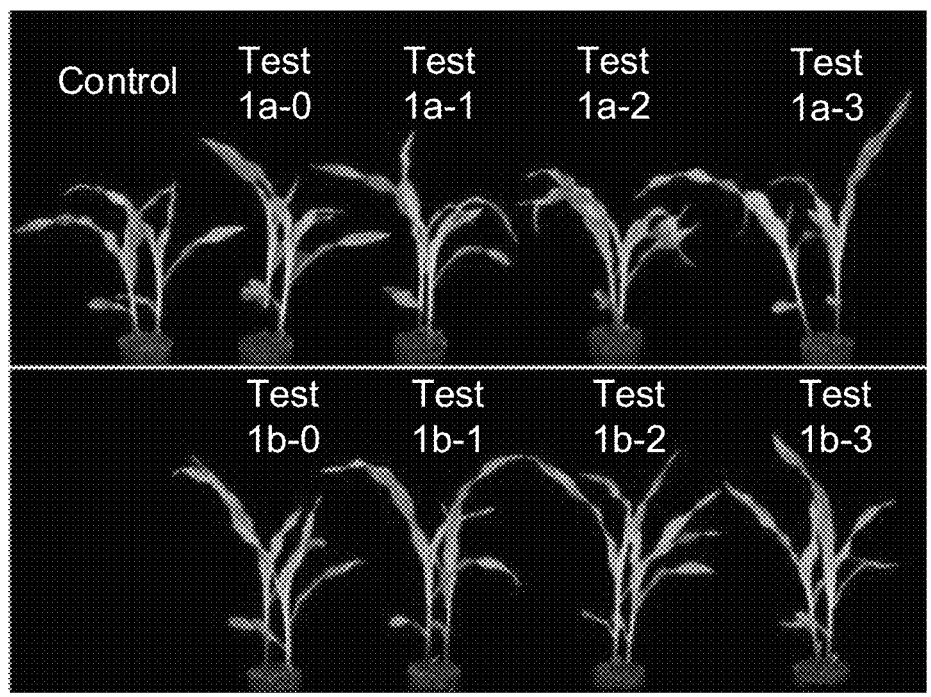
FIG. 1 shows phenotype observation of corn plants on the $14^{th}$ day after the application of 2,4-D ester herbicide in Example 1.

The inventors of the present invention surprisingly found that when a composition comprising exogenous glutamine, proline, and GABA is applied with an herbicide to a non-target plant, the composition significantly reduces damages caused by the herbicide to the non-target plant and relieves suppression of growth potential of the non-target plant caused by the herbicide.

Therefore, the present invention provides an herbicide safener. In some embodiments, the herbicide safener of the present invention is a concentrate herbicide safener, comprising between about 0.5 to about 25 g/L glutamic acid, between about 5 to about 250 g/L proline, and between about 20 to about 500 g/L GABA. A concentrate solution refers to a solution which is intended to be diluted with water to form a use solution prior to application to the plant.

In some embodiments, the concentration of glutamic acid in the concentrate herbicide safener is between about 0.1 to about 5 g/L, between about 0.5 to about 2.5 g/L, between about 1 to about 2.0 g/L, and preferably is, but is not limited to, about 0.1 g/L, about 0.25 g/L, about 0.5 g/L, about 0.75 g/L, about 1 g/L, about 1.5 g/L, about 2 g/L, about 2.5 g/L, about 3 g/L, about 3.5 g/L, about 4 g/L, about 4.5 g/L, about 5 g/L, or any concentration between about 0.1 g/L to about 5 g/L, such as about 1.86 g/L, about 2.31 g/L, and about 3.63 g/L. In some embodiments, the concentration of glutamic acid in the concentrate herbicide safener is about 0.5 g/L, about 1 g/L, or about 2 g/L.

In some embodiments, the concentration of proline in the concentrate herbicide safener is between about 1 to about 50 g/L, between about 5 to about 40 g/L, between about 7.5 to about 30 g/L, between about 10 to about 20 g/L, and preferably is, but is not limited to, about 1 g/L, about 5 g/L, about 10 g/L, about 15 g/L, about 20 g/L, about 25 g/L, about 30 g/L, about 35 g/L, about 40 g/L, about 45 g/L, about 50 g/L, or any concentration between about 1 g/L to 50 g/L, such as about 2.87 g/L, about 21.42 g/L, and about 42.89 g/L. In some embodiments, the concentration of proline in the concentrate herbicide safener is about 2 g/L, about 5 g/L, or about 10 g/L.

In some embodiments, the concentration of GABA in the concentrate herbicide safener is between about 4 to about 100 g/L, between about 5 to about 90 g/L, between about 10 to about 80 g/L, between about 15 to about 70 g/L, and preferably is, but is not limited to, about 4 g/L, about 5 g/L, about 7.5 g/L, about 10 g/L, about 15 g/L, about 20 g/L, about 25 g/L, about 30 g/L, about 35 g/L, about 40 g/L, about 45 g/L, about 50 g/L, about 55 g/L, about 60 g/L, about 65 g/L, about 70 g/L, about 75 g/L, about 80 g/L, about 85 g/L, about 90 g/L, about 95 g/L, about 100 g/L, or any concentration between about 4 g/L to 100 g/L, such as about 7.65 g/L, about 11.47 g/L, or about 28.69 g/L. In some embodiments, the concentration of GABA in the concentrate herbicide safener is about 10 g/L, about 20 g/L, or about 40 g/L.

In some embodiments, the concentrate herbicide safener is diluted 200 folds with water before use to form a use solution.

In some embodiments, the herbicide safener of the present invention is a ready to use herbicide safener, comprising between about 0.5 to about 25 mg/L glutamic acid, between about 5 to about 250 mg/L proline, and between about 20 to about 500 mg/L GABA. A ready to use solution is not diluted with water prior to application to the plant. A ready to use solution is a use solution when it is applied to the plant without further dilution.

In some embodiments, the concentration of glutamic acid in the ready to use herbicide safener is between about 0.5 to about 25 mg/L, between about 1 to about 20 mg/L, between about 2.5 to about 15 mg/L, between about 2.5 to about 10 mg/L, and preferably is, but is not limited to, about 0.5 mg/L, about 0.75 mg/L, about 1 mg/L, about 2 mg/L, about 3 mg/L, about 4 mg/L, about 5 mg/L, about 6 mg/L, about 7 mg/L, about 8 mg/L, about 9 mg/L, about 10 mg/L, about 12.5 mg/L, about 15 mg/L, about 17.5 mg/L, about 20 mg/L, about 22.5 mg/L, about 25 mg/L, or any concentration between about 0.5 mg/L to about 25 mg/L, such as about 3.86 mg/L, about 7.31 mg/L, and about 9.63 mg/L. In some embodiments, the concentration of glutamic acid in the ready to use herbicide safener is about 2.5 mg/L, about 5 mg/L, or about 10 mg/L.

In some embodiments, the concentration of proline in the ready to use herbicide safener is between about 5 to about 250 mg/L, between about 6 to about 200 mg/L, between about 7.5 to about 150 mg/L, between about 8 to about 100 mg/L, between about 10 to about 50 mg/L, and preferably is, but is not limited to, about 5 mg/L, about 6 mg/L, about 7 mg/L, about 8 mg/L, about 9 mg/L, about 10 mg/L, about 15 mg/L, about 20 mg/L, about 25 mg/L, about 30 mg/L, about 35 mg/L, about 40 mg/L, about 45 mg/L, about 50 mg/L, about 55 mg/L, about 60 mg/L, about 65 mg/L, about 70 mg/L, about 75 mg/L, about 80 mg/L, about 85 mg/L, about 90 mg/L, about 95 mg/L, about 100 mg/L, about 125 mg/L, about 150 mg/L, about 175 mg/L, about 200 mg/L, about 225 mg/L, about 250 mg/L, or any concentration between about 5 mg/L to 250 mg/L, such as about 26.87 mg/L, about 61.42 mg/L, and about 92.89 mg/L. In some embodiments, the concentration of proline in the ready to use herbicide safener is about 10 mg/L, about 25 mg/L, or about 50 mg/L.

In some embodiments, the concentration of GABA in the ready to use herbicide safener is between about 20 to about 500 mg/L, between about 30 to about 400 mg/L, between about 40 to about 300 mg/L, between about 50 to about 200 mg/L, and preferably is, but is not limited to, about 20 mg/L, about 30 mg/L, about 40 mg/L, about 50 mg/L, about 60 mg/L, about 70 mg/L, about 80 mg/L, about 90 mg/L, about 100 mg/L, about 110 mg/L, about 120 mg/L, about 130 mg/L, about 140 mg/L, about 150 mg/L, about 160 mg/L, about 170 mg/L, about 180 mg/L, about 190 mg/L, about 200 mg/L, about 250 mg/L, about 300 mg/L, about 350 mg/L, about 400 mg/L, about 450 mg/L, about 500 mg/L, or any concentration between about 20 mg/L to 500 mg/L, such as about 73.65 mg/L, about 101.47 mg/L, or about 128.69 mg/L. In some embodiments, the concentration of GABA in the ready to use herbicide safener is about 50 mg/L, about 100 mg/L, or about 200 mg/L.

In some embodiments, the herbicide safener of the present invention may include one or more adjuvant. In other embodiments, the herbicide safener of the present invention may not include an adjuvant. For example, the herbicide safener may include a surfactant and/or a drift control agent. Exemplary surfactants include, but are not limited to, cationic surfactants, anionic surfactants, zwitterionic surfactants, and nonionic surfactants, preferably including but not limited to, Tween® 20, Tween® 40, Tween® 60, Tween® 65, Tween® 80, Tween® 85, Laureth-4, Ceteth-2, Ceteth-20, Steareth-2, PEG40, PEG100, PEG150, PEG200, PEG600, Span® 20, Span® 40, Span® 60, Span® 65, Span® 80. An exemplary drift control agent includes LI 700®, which is commercially available from Loveland Products (Loveland, Colo., USA).

In some embodiments, the concentration of the adjuvant in the ready to use herbicide safener is between about 0.01 to 1% (v/v), and preferably is, but is not limited to, about 0.01, about 0.02, about 0.03, about 0.04, about 0.05, about 0.06, about 0.0.7, about 0.08, about 0.09, about 0.1, about 0.2, about 0.3, about 0.4, about 0.5, about 0.6, about 0.7, about 0.8, about 0.9, about 1% (v/v). In some embodiments, the concentration of the adjuvant in the ready to use herbicide safener is about 0.1% (v/v).

Suitable concentration ranges for the concentrate herbicide safener of the present invention are provided in Table 1, and suitable concentration ranges for the ready to use herbicide safener of the present invention are provided in Table 2. In some embodiments, the concentrate herbicide safener and the ready to use herbicide safener can comprise, consist of or consist essentially of the components listed in Table 1 and 2, respectively.

TABLE 1

Suitable concentrate herbicide safener

| Component | First example range (g/L) | Second example range (g/L) | Third example range (g/L) |
|---|---|---|---|
| Glutamic acid | 0.05-10 | 0.1-5 | 0.5-2.5 |
| Proline | 0.5-100 | 1-50 | 5-25 |
| GABA | 2-200 | 4-100 | 20-50 |

TABLE 2

Suitable ready to use herbicide safener

| Component | First example range (mg/L) | Second example range (mg/L) | Third example range (mg/L) |
|---|---|---|---|
| Glutamic acid | 0.1-50 | 0.5-25 | 1-10 |
| Proline | 1-500 | 5-250 | 10-100 |
| GABA | 10-1000 | 20-500 | 50-200 |

The present invention also provides a method for protecting a plant from herbicides, comprising a step of applying an herbicide safener to the plant, and the herbicide safener comprising between about 1 to about 10 mg/L glutamic acid, between about 10 to about 100 mg/L proline, and between about 50 to about 200 mg/L GABA.

In some embodiments, the herbicide safener of the present invention and an herbicide are applied to a plant at the same time. In some embodiments, the herbicide safener of the present invention is applied to a plant before application of an herbicide. For example, it may be effective to apply the herbicide safener a few minutes to a few days before application of an herbicide. In some embodiments, the herbicide safener of the present invention is applied to a plant after application of an herbicide. For example, it may be effective to apply the herbicide safener a few minutes to a few days after application of an herbicide.

In some embodiments, the herbicide safener of the present invention is applied to a non-target plant of an herbicide during the vegetative phase of the non-target plant. In some embodiments, the herbicide safener of the present invention is applied to a non-target plant of an herbicide during the reproductive phase of the non-target plant.

In some embodiments, the herbicide safener of the present invention is applied to plant foliage (for example, leaves, stems, flowers and/or fruits), for example as a foliar application or foliar spray. In some embodiments, the herbicide safener of the present invention is applied to plant roots, such as by a soil application or soil drench, and/or to seeds, such as by a seed treatment.

As used herein, the term "herbicides" refers to substances used to control unwanted plants. Herbicides can be classified in many ways based on different characteristics, such as inorganic vs. organic, soil applied vs. foliar applied, preemergence vs. postemergence, selective vs. non-selective, or contact vs. systemic. Examples of active ingredients of herbicides include, but are not limited to, 2,4-dichlorophenoxyacetic acid (2,4-D), 2-chloro-N-(ethoxymethyl)-N-(2-ethyl-6-methylphenyl)acetamide (acetochlor), sodium 5-(2-chloro-4-(trifluoromethyl)phenoxy)-2-nitrobenzoate (acifluorfen-Na), 2-chloro-N-(2,6-diethylphenyl)-N-(methoxymethyl)acetamide (alachlor), 4-amino-3,6-dichloropyridine-2-carboxylic acid (aminopyralid), 1H-1,2,4-triazol-5-amine (amitrole), 6-chloro-$N^2$-ethyl-$N^4$-(propan-2-yl)-1,3,5-triazine-2,4-diamine (atrazine), N-butyl-N-ethyl-2,6-dinitro-4-(trifluoromethyl)aniline (benfluralin), methyl 2-[(4,6-dimethoxypyrimidin-2-yl)carbamoylsulfamoylmethyl]benzoate (bensulfuron-methyl), S-[2-(benzenesulfonamido)ethyl] O,O-di(propan-2-yl) phosphorodithioate (bensulide), 3-isopropyl-1H-2,1,3-benzothiadiazin-4(3H)-one 2,2-dioxide (bentazon), 5-bromo-3-(butan-2-yl)-6-methylpyrimidine-2,4(1H,3H)-dione (bromacil), ethyl 2-chloro-3-[2-chloro-5-[4-(difluoromethyl)-3-methyl-5-oxo-1,2,4-triazol-1-yl]-4-fluorophenyl]propanoatem (carfentrazone-ethyl), ethyl 2-[(4-chloro-6-methoxypyrimidin-2-yl)carbamoylsulfamoyl]benzoate (chlorimuron-ethyl), 1-(2-chlorophenyl)sulfonyl-3-(4-methoxy-6-methyl-1,3,5-triazin-2-yl)urea (chlorsulfuron), 2-[(E)-N-[(E)-3-chloro-prop-2-enoxy]-C-ethylcarbonimidoyl]-5-(2-ethylsulfanyl-propyl)-3-hydroxycyclohex-2-en-1-one (clethodim), 3,6-dichloro-2-pyridinecarboxylic acid (clopyralid), 2-methoxy-3,6-dichlorobenzoic acid or 3,6-dichloro-o-anisic acid (dicamba), 6,7-dihydrodipyrido[1,2-a:2',1'-c]pyrazine-5,8-diium dibromide (diquat), 3-(3,4-dichlorophenyl)-1,1-dimethylurea (diuron), S-Ethyl dipropylthiocarbamate (EPTC), butyl (2R)-2-[4-[5-(trifluoromethyl)pyridin-2-yl]oxyphenoxy]propanoate (fluazifop-P-butyl), N-(2,6-difluorophenyl)-5-methyl-[1,2,4]triazolo[1,5-a]pyrimidine-2-sulfonamide (flumetsulam), 2-(7-fluoro-3-oxo-4-prop-2-ynyl-1,4-benzoxazin-6-yl)-4,5,6,7-tetrahydroisoindole-1,3-dione (flumioxazin), [(4-amino-3,5-dichloro-6-fluoro-2-pyridinyl)oxy]acetic acid (fluroxypyr), 5-[2-chloro-4-(trifluoromethyl)phenoxy]-N-methylsulfonyl-2-nitrobenzamide (fomesafen), azanium;2-amino-4-[hydroxy(methyl)phosphoryl]butanoate (glufosinate-ammonium), N-(phosphonomethyl)glycine (glyphosate), methyl 4-amino-3-chloro-6-(4-chloro-2-fluoro-3-methoxyphenyl)pyridine-2-carboxylate (halauxifen-methyl), 3-cyclohexyl-6-dimethylamino-1-methyl-1,3,5-triazine-2,4-dione (hexazinone), 5-(methoxymethyl)-2-(4-methyl-5-oxo-4-propan-2-yl-1H-imidazol-2-yl)pyridine-3-carboxylic acid (imazamox), (RS)-2-(4-methyl-5-oxo-4-propan-2-yl-1H-imidazol-2-yl)pyridine-3-carboxylic acid (imazapyr), 5-ethyl-2-(4-methyl-5-oxo-4-propan-2-yl-1H-imidazol-2-yl)pyridine-3-carboxylic acid (imazethapyr), (5-cyclopropyl-1,2-oxazol-4-yl)[2-methylsulfonyl-4-(trifluoromethyl)phenyl]methanone (isoxaflutole), Ethyl O-[5-(2-chloro-α,α,α-trifluoro-p-tolyloxy)-2-nitrobenzoyl]-DL-lactate (lactofen), 2-methyl-4-chlorophenoxyacetic acid (MCPA), 4-(4-chloro-o-tolyloxy)butyric acid (MCPB), 4-amino-6-tert-butyl-3-methylsulfanyl-1,2,4-triazin-5-one (metribuzin), 2-{[(4-methoxy-6-methyl-1,3,5-triazin-2-yl)amino]-oxomethyl]sulfamoyl}benzoic acid methyl ester (metsulfuron-methyl), monosodium methanearsonate (MSMA), 2-[(4,6-dimethoxypyrimidin-2-yl) carbamoylsulfamoyl]-N,N-dimethylpyridine-3-carboxamide (nicosulfuron), 4-chloro-5-(methylamino)-2-[3-(trifluoromethyl)phenyl]pyridazin-3-one (norflurazon), 5-tert-butyl-3-(2,4-dichloro-5-propan-2-yloxyphenyl)-1,3,4-oxadiazol-2-one (oxadiazon), 2-chloro-1-(3-ethoxy-4-nitrophenoxy)-4-(trifluoromethyl)benzene (oxyfluorfen), 1,1'-dimethyl-4,4'-bipyridinium dichloride (paraquat), 3,4-dimethyl-2,6-dinitro-N-pentan-3-yl-aniline (pendimethalin), 2-(2,2-difluoroethoxy)-N-(5,8-dimethoxy-[1,2,4]triazolo[1,5-c]pyrimidin-2-yl)-6-(trifluoromethyl)benzenesulfonamide (penoxsulam), 4-amino-3,5,6-trichloropicolinic acid (picloram), 6-methylsulfanyl-2-N,4-N-di(propan-2-yl)-1,3,5-triazine-2,4-diamine (prometryn), N-(3,4-Dichlorophenyl)propanamide (propanil), 1-(4-methoxy-6-methyl-1,3,5-triazin-2-yl)-3-[2-(3,3,3-trifluoropropyl)phenyl]sulfonylurea (prosulfuron), 3,7-dichloro-8-quinolinecarboxylic acid (quinclorac), 7-chloro-3-methylquinoline-8-carboxylic acid (quinmerac), 1-(4,6-dimethoxypyrimidin-2-yl)-3-(3-ethylsulfonylpyridin-2-yl)sulfonylurea (rimsulfuron), 2-chloro-N-(2-ethyl-6-methylphenyl)-N-[(2S)-1-methoxypropan-2-yl]acetamide (s-metolachlor), N'-{2-chloro-4-fluoro-5-[1,2,3,6-tetrahydro-3-methyl-2,6-dioxo-4-(trifluoromethyl)pyrimidin-1-yl]benzoyl}-N-isopropyl-N-methylsulfamide (saflufenacil), 2-[(E)-N-ethoxy-C-propylcarbonimidoyl]-5-(2-ethylsulfanylpropyl)-3-hydroxycyclohex-2-en-1-one (sethoxydim), N-{2,4-Dichloro-5-[4-(difluoromethyl)-3-methyl-5-oxo-4,5-dihydro-1H-1,2,4-triazol-1-yl]phenyl}methanesulfonamide (sulfentrazone), 1-(4,6-dimethoxypyrimidin-2-yl)-3-(2-ethylsulfonylimidazo[1,2-a]pyridin-3-yl)sulfonylurea (sulfosulfuron), methyl 3-[(4-methoxy-6-methyl-1,3,5-triazin-2-yl)carbamoylsulfamoyl]thiophene-2-carboxylate (thifensulfuron-methyl), 3,5,6-Trichloro-2-pyridinyloxyacetic acid (triclopyr), 2,6-dinitro-N,N-dipropyl-4-(trifluoromethyl)aniline (trifluralin), and methyl 2-[[4-(dimethylamino)-6-(2,2,2-trifluoroethoxy)-1,3,5-triazin-2-yl]carbamoylsulfamoyl]-3-methylbenzoate (triflusulfuron-methyl).

Unless otherwise defined, all technical and scientific terms used herein have the same meaning as commonly understood by one of ordinary skill in the art to which this invention pertains. In the case of conflict, the present document, including definitions will control.

As used herein, the term "glutamic acid," also known as 2-aminopentanedioic acid, refers to an amino acid having the formula $C_5H_9NO_4$ and the following chemical structure:

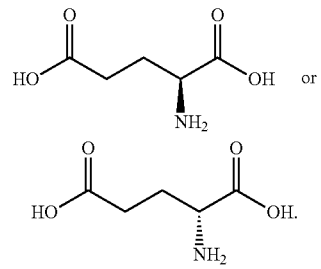

As used herein, the term "proline," also known as pyrrolidine-2-carboxylic acid, refers to an amino acid having the formula $C_5H_9NO_2$ and the following chemical structure:

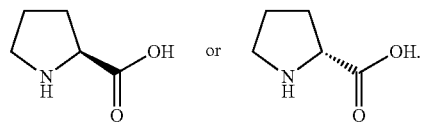 [SMILES: O=C(O)[C@@H]1CCCN1 ; "or" ; O=C(O)[C@H]1CCCN1]

As used herein, the term "γ-Aminobutyric acid (GABA)," also known as 4-aminobutanoic acid, refers to a non-protein amino acid having the formula of $C_4H_9NO_2$ and the following chemical structure:

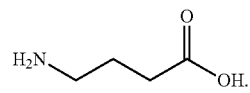

As used herein, the term "target plant" refers to the plants to which an herbicide is designed to kill. Examples of target plants of herbicides include, but are not limited to, horseweed, marestail, common ragweed, common lambsquarters, pigweed, prickly lettuce, giant foxtail, smooth crabgrass, shepherdspurse, yellow rocket, common groundsel, Japanese brome, downy brome, common burdock, yellow sweetclover, bull thistle, musk thistle, teasel, wild carrot, poison hemlock, wild parsnip, spotted knapweed, chickweed, clover, dandelion, wild geranium, ivy, milkweed, plaintain (broadleaf), Canada thistle, tree-of-heaven, black locust, quackgrass, Japanese knotweed, Johnsongrass, common reed, creeping bentgrass, and wild garlic.

As used herein, the term "non-target plant" refers to the plants to which an herbicide is designed to leave unharmed. Agronomic crops are the most common non-target plant of herbicides. Examples of agronomic crops include, but are not limited to, alfalfa, barley, cotton, wheat, rape, sugar beets, corn (maize), sorghum, soybeans, rice, oats, peanuts, vegetables, tomato, potato, perennial plantation crops including coffee, cocoa, oil palm, rubber, sugarcane, citrus, grapes, fruit trees, nut trees, banana, plantain, pineapple, hops, tea and forests such as eucalyptus and conifers (e.g., loblolly pine), and turf species (e.g., Kentucky bluegrass, St. Augustine grass, Kentucky fescue and Bermuda grass).

As used herein, the term "damages caused by herbicides" refers to the negative effects on the growth of a non-target plant due to the application of an herbicide. Examples of damages caused by herbicides include, but are not limited to, general and interveinal chlorosis, mottled chlorosis, yellow spotting, purpling of the leaves, necrosis, stem dieback, shoot and petiole twisting, leaf cupping, stunting, curling, strapping, feathering, roughness, crinkling of the leaf surface, vein discoloration, fingering of the leaf margins, stem elongation, spindly growth, smaller and weaker roots, decreased root/shoot ratio, less sturdy plant architecture, and lodging, which leads to harvest losses and diminished grain quality.

As used herein, the term "protecting a plant from damages caused by herbicides" refers to reducing, alleviating, lessening, slowing down, diminishing, removing, or eliminating the negative effects on the growth of a non-target plant due to the application of an herbicide. In some embodiments, protecting a plant from damages caused by herbicides means that compared with a non-target plant treated with an herbicide only, the same kind of non-target plant treated with the herbicide safener of the present invention before/after/or at the same time of the application of the herbicide has wider leaves, longer and stronger roots, more root dry weight, and higher root to shoot dry weight ratio.

As used herein, the term "surfactants" refers to molecules with the chemical formula RCOOM, where R is a long-chain alkyl group and M is a base, and therefore, surfactants are molecules containing both lipophilic groups (the long-chain alkyl group) and hydrophilic groups, which allow oily substances to be dispersed or dissolved in water. The surfactants described herein include, but are not limited to, cationic surfactants, anionic surfactants, zwitterionic surfactants, and non-ionic surfactants, such as Tween® series, Laureth series, Ceteth series, Steareth series, PEG series, and Span® series.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The term "a," "an," or "the" disclosed in the present invention is intended to cover one or more numerical values in the specification and claims unless otherwise specified. For example, "an element" indicates one or more than one element.

It is to be understood that both the foregoing general description and the following detailed description are exemplary and explanatory only and are not restrictive of the invention.

EXAMPLES

Example 1 Protection of Corn Plants from the Damage Caused by 2,4-D Ester Herbicide 1. Preparation of Test Plants Corn seeds (*Zea mays* 'White Pearl') were sown in pots containing culture medium (peat soil:vermiculite=3:1).

2. Plant Treatment

The corn seeds were applied with the reagents listed in Table 3 once using a soil drench treatment before germination. A 2,4-D ester herbicide (active ingredient: 81.8% (w/v) of 2,4-D isooctyl ester) was used as the herbicide in this Example. A low dose [4.8 fluid ounces (fl. oz.)/acre, equivalent to about 0.0351 ml/m$^2$] and a high dose (9.6 fl. oz./acre, equivalent to about 0.0702 ml/m$^2$) of the 2,4-D ester herbicide were applied to the corn seeds, respectively. The control group was treated with distilled water. The plants were watered twice a week and analyzed on the 14th day after the application.

TABLE 3

Summary of the reagents applied to corn seeds in Example 1.

| Group | 2,4-D ester Herbicide (fl. oz./acre) | Glutamic Acid (mg/L) | Proline (mg/L) | GABA (mg/L) |
| --- | --- | --- | --- | --- |
| Control group | 0 | 0 | 0 | 0 |
| Test group 1a-0: Low dose herbicide | 4.8 | 0 | 0 | 0 |
| Test group 1a-1: Low dose herbicide + Formula 1 | 4.8 | 2.5 | 10 | 50 |
| Test group 1a-2: Low dose herbicide + Formula 2 | 4.8 | 5 | 25 | 100 |
| Test group 1a-3: Low dose herbicide + Formula 3 | 4.8 | 10 | 50 | 200 |
| Test group 1b-0: High dose herbicide | 9.6 | 0 | 0 | 0 |
| Test group 1b-1: High dose herbicide + Formula 1 | 9.6 | 2.5 | 10 | 50 |
| Test group 1b-2: High dose herbicide + Formula 2 | 9.6 | 5 | 25 | 100 |
| Test group 1b-3: High dose herbicide + Formula 3 | 9.6 | 10 | 50 | 200 |

3. Analyses 3.1 Analyses of Leaves: Fourteen (14) days after the application of reagents, the morphology of the leaves and stems of each corn plant was observed, and the fresh weight of leaves and stems of each corn plant was measured. In addition, corn leaves were collected, and the leaf area of the third leaf of each corn plant was measured by a leaf analyzer (WinFOLIA™, Regent Instruments Inc., Québec, Canada). Leaves and stems of each corn plant were dried at 50° C. overnight, and then the dry weight was measured. Each group has 3 replications.

3.2 Analyses of Roots: Fourteen (14) days after the application of reagents, the morphology of the roots of each corn plant was observed. In addition, roots of each corn plant were dried at 50° C. overnight, and then the dry weight was measured. Each group has 3 replications.

3.3 Statistical analyses: Average and standard deviation (S.D.) of each group (n=12) were calculated. Statistically significant differences between control group and test groups were assessed by Student's T-test, where p-value<0.05 was considered a significant difference and indicated by an asterisk (*). The p-value<0.01 and 0.001 was considered a highly and extremely significant difference respectively.  $p<0.01$; * $p<0.001$.

4. Results

Figure 2:
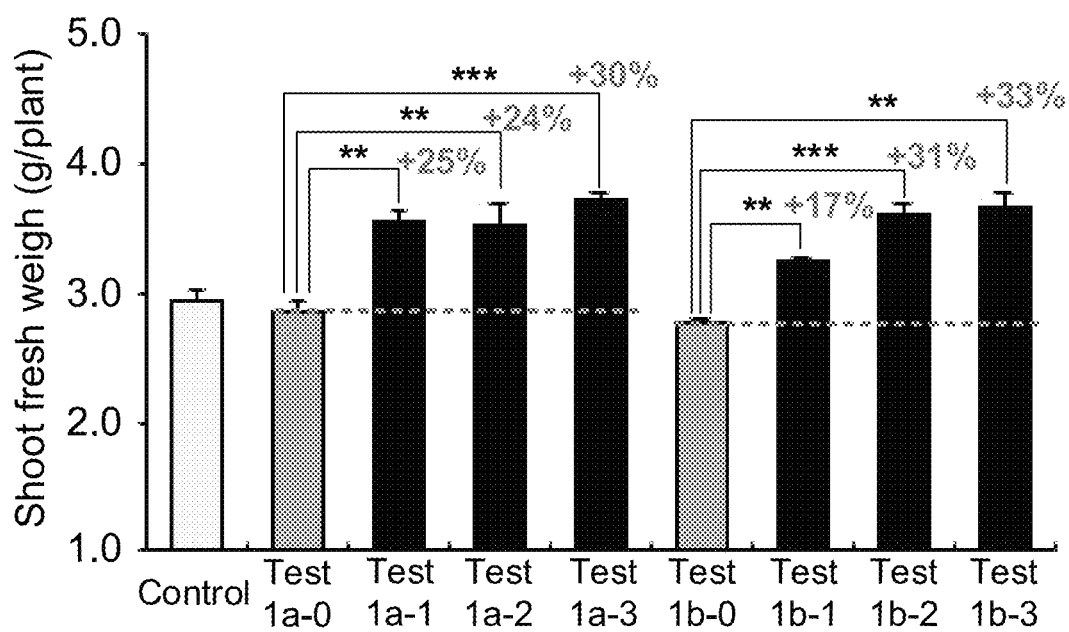
FIG. 2 shows the fresh weights of corn shoots on the 14th day after the application of 2,4-D ester herbicide in Example 1. The numbers above the bars of test groups 1a-1, 1a-2, and 1a-3 indicate the percentage increase compared to test group 1a-0. The numbers above the bars of test groups 1b-1, 1b-2, and 1b-3 indicate the percentage increase compared to test group 1b-0.  $p<0.01$ and * $p<0.001$.

As shown in FIGS. 1 and 2, the fresh weights of the corn plants treated with 2,4-D ester herbicide only (Test groups 1a-0 and 1b-0) are slightly less than the fresh weight of the Control group. The fresh weights of the corn plants treated with 4.8 fl. oz./acre 2,4-D ester herbicide and the herbicide safener of the present invention (Test groups 1a-1, 1a-2, and 1a-3) are 24% to 30% significantly more than the fresh weights of the corn plants treated with 4.8 fl. oz./acre 2,4-D ester herbicide only (Test group 1a-0) ($p<0.01$ or $p<0.001$). Similarly, the corn plants treated with 9.6 fl. oz./acre 2,4-D ester herbicide and the herbicide safener of the present invention (Test groups 1b-1, 1b-2, and 1b-3) have a 17% to 33% significant increase in fresh weight as compared with the corn plants treated with 9.6 fl. oz./acre 2,4-D ester herbicide only (Test group 1b-0) ($p<0.01$ or $p<0.001$).

Figure 3:
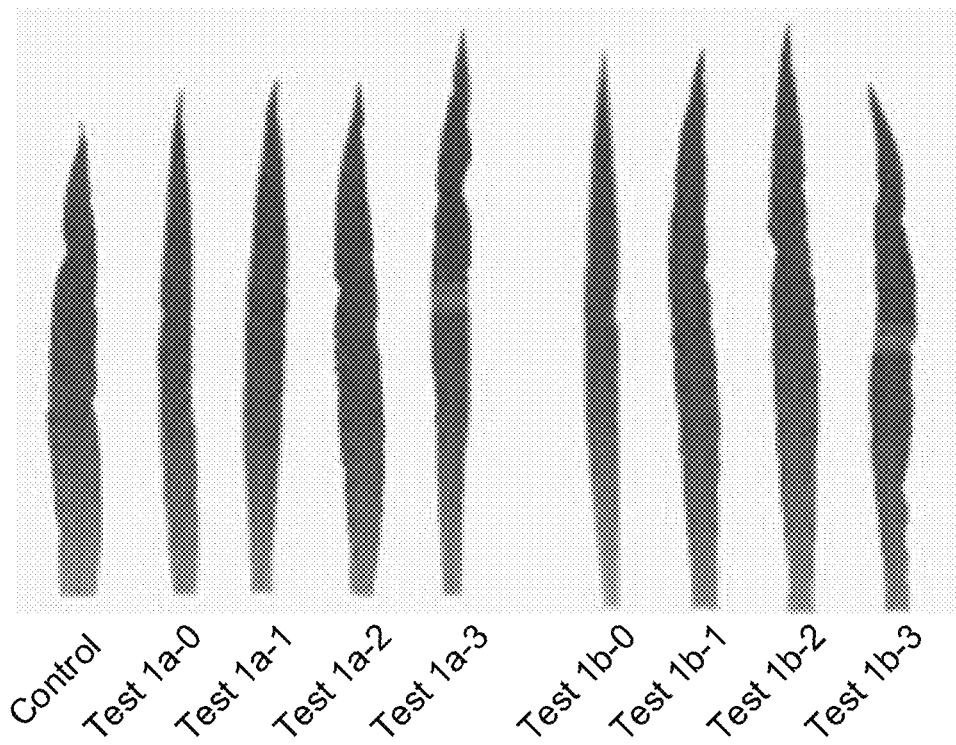
FIG. 3 shows phenotype observation of the third leaves of corn plants on the $14^{th}$ day after the application of 2,4-D ester herbicide in Example 1.
Figure 4:
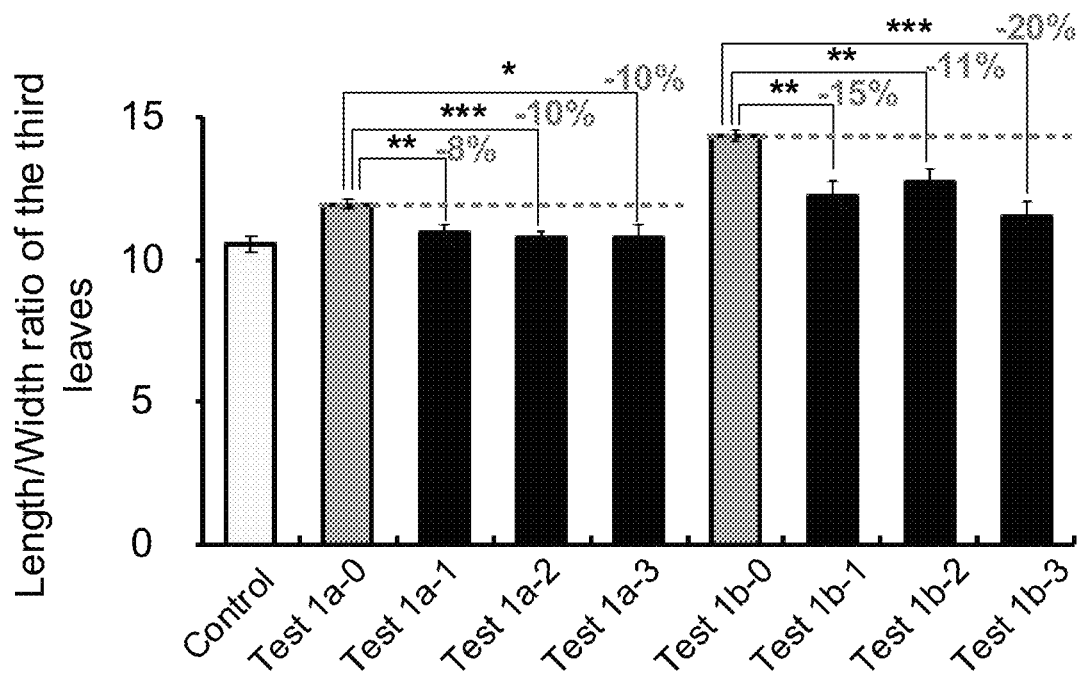
FIG. 4 shows the length/width ratios of the third leaves of corn plants on the $14^{th}$ day after the application of 2,4-D ester herbicide in Example 1. The numbers above the bars of test groups 1a-1, 1a-2, and 1a-3 indicate the percentage increase compared to test group 1a-0. The numbers above the bars of test groups 1b-1, 1b-2, and 1b-3 indicate the percentage increase compared to test group 1b-0. * $p<0.05$, $p<0.01$, and *$p<0.001$.

In addition, as shown in FIGS. 3 and 4, compared with the Control group, 2,4-D ester herbicide causes adverse effects to the leaf morphology of the corn plants (Test groups 1a-0 and 1b-0), in which corn leaves are longer and narrower, leading to an increase in the leaf length/width ratio. Compared with the leaves of the corn plants treated with 2,4-D ester herbicide only (Test groups 1a-0 and 1b-0), the leaves of the corn plants treated with 2,4-D ester herbicide and the herbicide safener of the present invention (Test groups 1a-1, 1a-2, 1a-3, 1b-1, 1b-2, and 1b-3) are wider and have significant decreases in the leaf length/width ratios ($p<0.05$, $p<0.01$, or $p<0.001$), which are closer to the leaf length/width ratio of the Control group.

The results above indicate that the herbicide safener of the present invention alleviates the adverse effects of 2,4-D ester herbicides to the leaves and shoots of a non-target crop.

Figure 5:
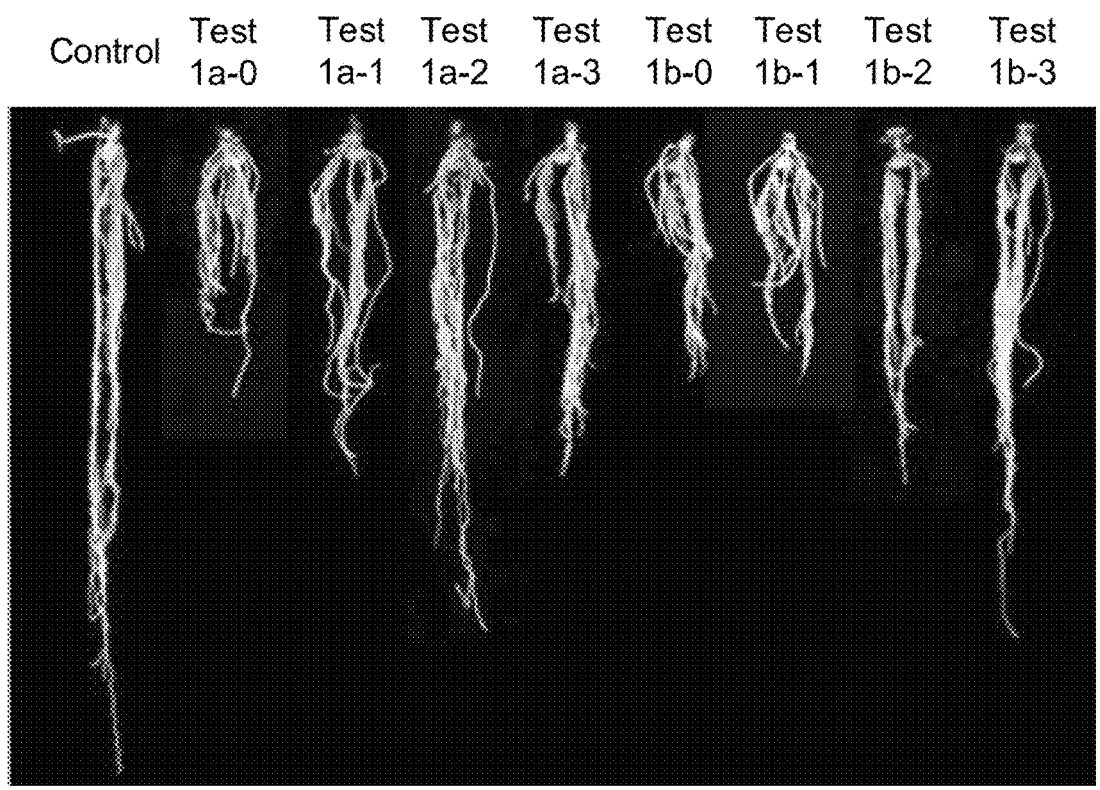
FIG. 5 shows phenotype observation of the roots of corn plants on the 14th day after the application of 2,4-D ester herbicide in Example 1.

As shown in FIG. 5, compared with the Control group, 2,4-D ester herbicide reduces the growth of the roots of the corn plants (Test groups 1a-0 and 1b-0). The roots of the corn plants treated with 2,4-D ester herbicide and the herbicide safener of the present invention (Test groups 1a-1, 1a-2, 1a-3, 1b-1, 1b-2, and 1b-3) grow better and longer than the roots of the corn plants treated with 2,4-D ester herbicide only (Test groups 1a-0 and 1b-0).

Figure 6:
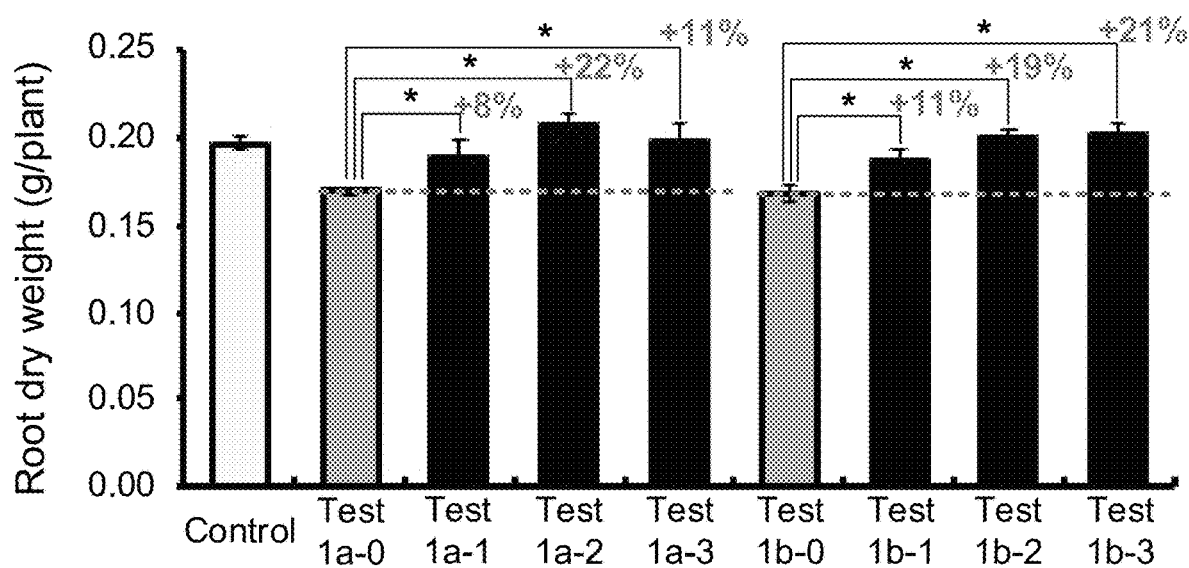
FIG. 6 shows the root dry weight of corn plants on the $14^{th}$ day after the application of 2,4-D ester herbicide in Example 1. The numbers above the bars of test groups 1a-1, 1a-2, and 1a-3 indicate the percentage increase compared to test group 1a-0. The numbers above the bars of test groups 1b-1, 1b-2, and 1b-3 indicate the percentage increase compared to test group 1b-0. * $p<0.05$.

As shown in FIG. 6, the root dry weights of the corn plants treated with 2,4-D ester herbicide only (Test groups 1a-0 and 1b-0) are much less than the root dry weight of the Control group. The root dry weights of the corn plants treated with 4.8 fl. oz./acre 2,4-D ester herbicide and the herbicide safener of the present invention (Test groups 1a-1, 1a-2, and 1a-3) are 8% to 22% significantly more than the root dry weights of the corn plants treated with 4.8 fl. oz./acre 2,4-D ester herbicide only (Test group 1a-0) ($p<0.05$). Similarly, the corn plants treated with 9.6 fl. oz./acre 2,4-D ester herbicide and the herbicide safener of the present invention (Test groups 1b-1, 1b-2, and 1b-3) have a 11% to 21% significant increase in root dry weights as compared with the corn plants treated with 9.6 fl. oz./acre 2,4-D ester herbicide only (Test group 1b-0) ($p<0.05$).

The results above indicate that the herbicide safener of the present invention alleviates the adverse effects of 2,4-D ester herbicide to the roots of a non-target crop.

Figure 7:
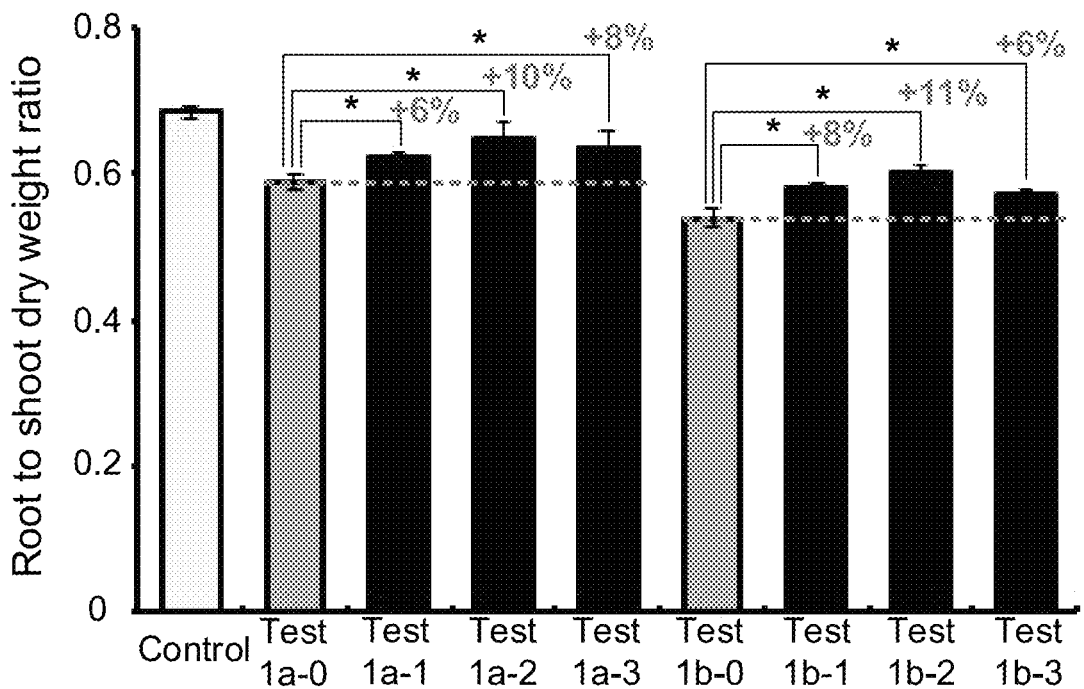
FIG. 7 shows the root to shoot dry weight ratios of corn plants on the $14^{th}$ day after the application of 2,4-D ester herbicide in Example 1. The numbers above the bars of test groups 1a-1, 1a-2, and 1a-3 indicate the percentage increase compared to test group 1a-0. The numbers above the bars of test groups 1b-1, 1b-2, and 1b-3 indicate the percentage increase compared to test group 1b-0. * $p<0.05$.

As shown in FIG. 7, the root to shoot dry weight ratio of the corn plants treated with 2,4-D ester herbicide only (Test groups 1a-0 and 1b-0) are much less than the ratio of the Control group, indicating that the herbicide causes unwanted stem elongation of the corn plants and less sturdy plant architecture, which may lead to lodging and harvest losses. The root to shoot dry weight ratios of the corn plants treated with 2,4-D ester herbicide and the herbicide safener of the present invention (Test groups 1a-1, 1a-2, 1a-3, 1b-1, 1b-2, and 1b-3) are significantly higher than the ratios of the corn plants treated with 2,4-D ester herbicide only (Test groups 1a-0 and 1b-0) ($p<0.05$). The results indicate that the herbicide safener of the present invention increases the root to shoot dry weight ratios of a non-target crop, makes the non-target crop shorter and sturdier, and prevents lodging.

Example 2 Protection of Soybean Plants from the Damage Caused by Glyphosate

Herbicide

1. Preparation of Test Plants

Glyphosate resistant soybean seeds (S29RY05, Dyna-Gro Seed, Genesseo, Ill.) were sown in pots containing culture medium (peat soil:perlite=3:1), 4 plants/pot.

2. Plant Treatment

Soybean plants were applied with the reagents listed in Table 4 at the stage of V1 (one set of unfolded trifoliolate leaves) once using a foliar spray treatment. A glyphosate herbicide (active ingredient: 48.7% (w/v) of Glyphosate) was used as the herbicide in this Example. A low dose (0.375 lb a.e./acre) and a high dose (0.75 lb a.e./acre) of the glyphosate herbicide were applied to the soybean plants, respectively. The control group was treated with 0.1% (v/v) Tween® 80. The plants were watered twice a week and analyzed on the 9th day after the application.

TABLE 4

Summary of the reagents applied to soybean plants in Example 2.

| Group | Glyphosate Herbicide (lb a.e./acre) | Glutamic Acid (mg/L) | Proline (mg/L) | GABA (mg/L) | Tween® 80 (%, v/v) |
| --- | --- | --- | --- | --- | --- |
| Control group | 0 | 0 | 0 | 0 | 0.1 |
| Test group 2a-0: Low dose herbicide | 0.375 | 0 | 0 | 0 | 0.1 |
| Test group 2a-1: Low dose herbicide + Formula 1 | 0.375 | 2.5 | 10 | 50 | 0.1 |
| Test group 2a-2: Low dose herbicide + Formula 2 | 0.375 | 5 | 25 | 100 | 0.1 |

TABLE 4-continued

Summary of the reagents applied to soybean plants in Example 2.

| Group | Glyphosate Herbicide (lb a.e./acre) | Glutamic Acid (mg/L) | Proline (mg/L) | GABA (mg/L) | Tween® 80 (%, v/v) |
|---|---|---|---|---|---|
| Test group 2b-0: High dose herbicide | 0.75 | 0 | 0 | 0 | 0.1 |
| Test group 2b-1: High dose herbicide + Formula 1 | 0.75 | 2.5 | 10 | 50 | 0.1 |
| Test group 2b-2: High dose herbicide + Formula 2 | 0.75 | 5 | 25 | 100 | 0.1 |

3. Analyses

Methods for analyzing leaves and statistics are the same as described in Example 1.

4. Results

Figure 8:
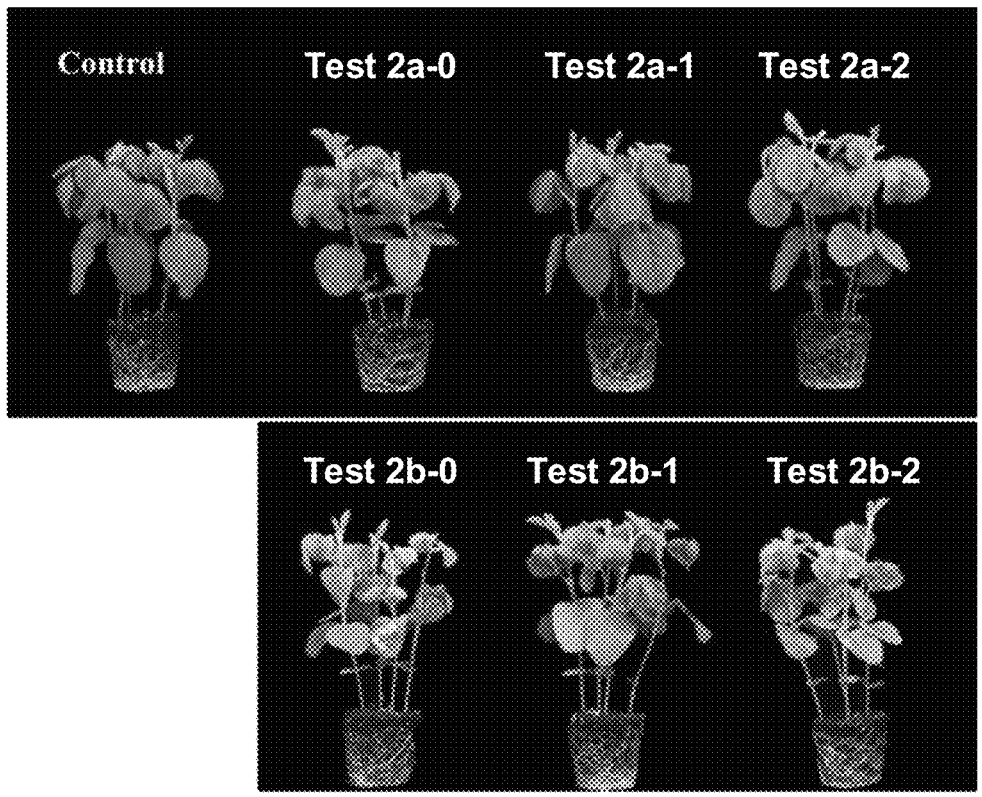
FIG. 8 shows phenotype observation of soybean plants on the 9th day after the application of glyphosate herbicide in Example 2.
Figure 9:
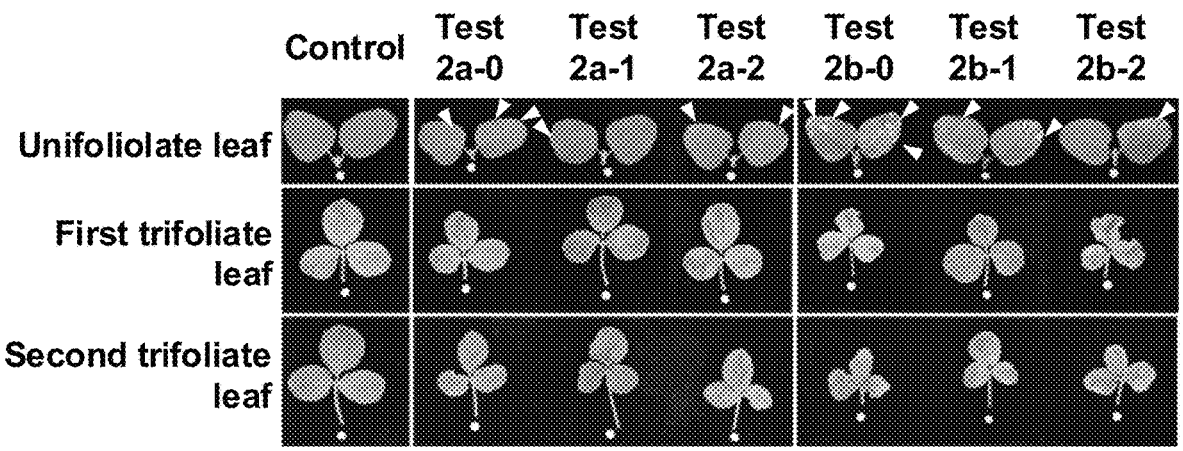
FIG. 9 shows phenotype observation of soybean leaves on the $9^{th}$ day after the application of glyphosate herbicide in Example 2. The triangles indicate brown or red rust spots caused by the herbicide.

As shown in FIGS. 8 and 9, glyphosate herbicide inhibits soybean leaf emergence and leaf expansion and causes brown or red rust spots on unifoliolate leaves (Test groups 2a-0 and 2b-0). Soybean plants treated with glyphosate herbicide and the herbicide safener of the present invention (Test groups 2a-1, 2a-2, 2b-1, and 2b-2) shows more leaf emergence and leaf expansion and less rust spots than soybean plants treated with glyphosate herbicide only (Test groups 2a-0 and 2b-0).

Figure 10:
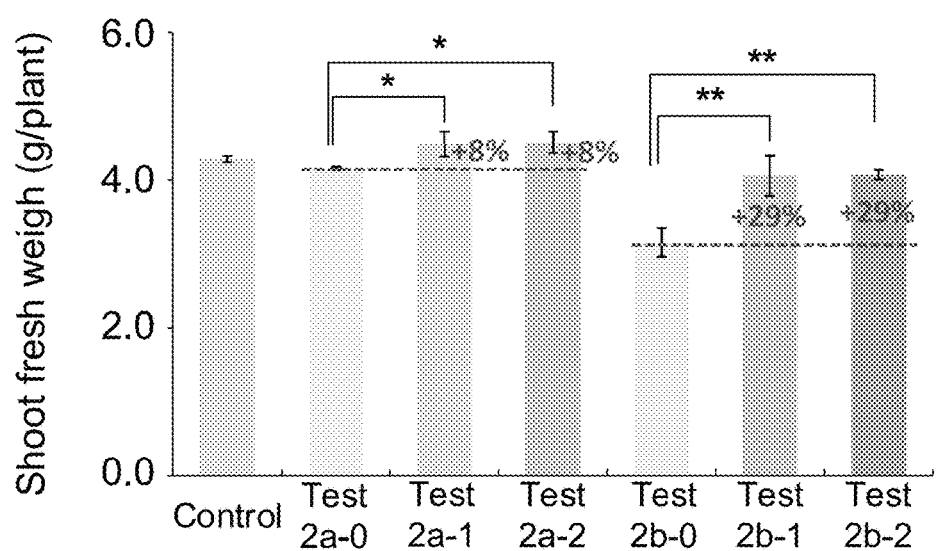
FIG. 10 shows the fresh weights of soybean shoots on the 9th day after the application of glyphosate herbicide in Example 2. The numbers above the bars of test groups 2a-1 and 2a-2 indicate the percentage increase compared to test group 2a-0. The numbers above the bars of test groups 2b-1 and 2b-2 indicate the percentage increase compared to test group 2b-0. * $p<0.05$ and ** $p<0.01$.

In addition, as shown in FIG. 10, the shoot fresh weights of the soybean plants treated with 0.375 lb ae/acre glyphosate herbicide and the herbicide safener of the present invention (Test groups 2a-1 and 2a-2) are 8% significantly more than the shoot fresh weights of the soybean plants treated with 0.375 lb ae/acre glyphosate herbicide only (Test group 2a-0) ($p<0.05$). Similarly, the soybean plants treated with 0.75 lb ae/acre glyphosate herbicide and the herbicide safener of the present invention (Test groups 2b-1 and 2b-2) have a 29% significant increase in fresh weight as compared with the soybean plants treated with 0.75 lb ae/acre glyphosate herbicide only (Test group 2b-0) ($p<0.01$).

The results above indicate that the herbicide safener of the present invention alleviates the adverse effects of glyphosate herbicide to the leaves of a non-target crop.

Example 3 Protection of Wheat Plants from the Damage caused by Metsulfuron Methyl Herbicide 1. Preparation of Test Plants Wheat seeds (Taichung Sel. 2) were sown in pots containing culture medium (peat soil:vermiculite=3:1).

2. Plant Treatment

Wheat plants were applied with the reagents listed in Table 5 at the two-leaf stage once using a foliar spray treatment. A metsulfuron methyl herbicide (active ingredient: 60% (w/w) of metsulfuron methyl) was used as the herbicide in this Example. A low dose (0.1 oz./acre) and a high dose (0.2 oz./acre) of metsulfuron methyl herbicide were applied to the wheat plants, respectively. The control group was treated with 0.1% (v/v) Tween® 80. After the treatment, the plants were placed under day/night temperature of 15/10° C. for 5 days to create low-temperature stress and then maintained at room temperature (RT, day/night temperature of 25/20° C.) for 14 days of recovery. The plants were watered twice a week and analyzed on the 7th day and the 14th day after returning to RT.

TABLE 5

Summary of the reagents applied to wheat plants in Example 3.

| Group | Metsulfuron Methyl Herbicide (oz./acre) | Glutamic Acid (mg/L) | Proline (mg/L) | GABA (mg/L) | Tween® 80 (%, v/v) |
|---|---|---|---|---|---|
| Control group | 0 | 0 | 0 | 0 | 0.1 |
| Test group 3a-0: Low dose herbicide | 0.1 | 0 | 0 | 0 | 0.1 |
| Test group 3a-1: Low dose herbicide + Formula 1 | 0.1 | 5 | 25 | 100 | 0.1 |
| Test group 3b-0: High dose herbicide | 0.2 | 0 | 0 | 0 | 0.1 |
| Test group 3b-1: High dose herbicide + Formula 1 | 0.2 | 5 | 25 | 100 | 0.1 |

3. Analyses

Methods for analyzing leaves and roots and statistics are the same as described in Example 1.

4. Results

Under low-temperature stress, wheat plants are less able to metabolize herbicides and therefore more susceptible to damage. Herbicides are usually applied to wheat in the spring to prevent yield loss. However, low temperature in the spring may severely damage wheat treated with herbicides. In this Example, wheat plants were treated with herbicide and the herbicide safener of the present invention under low-temperature stress (15/10° C., day/night) to test the herbicide safener's protection against damage caused by herbicide under low-temperature stress.

Figure 11:
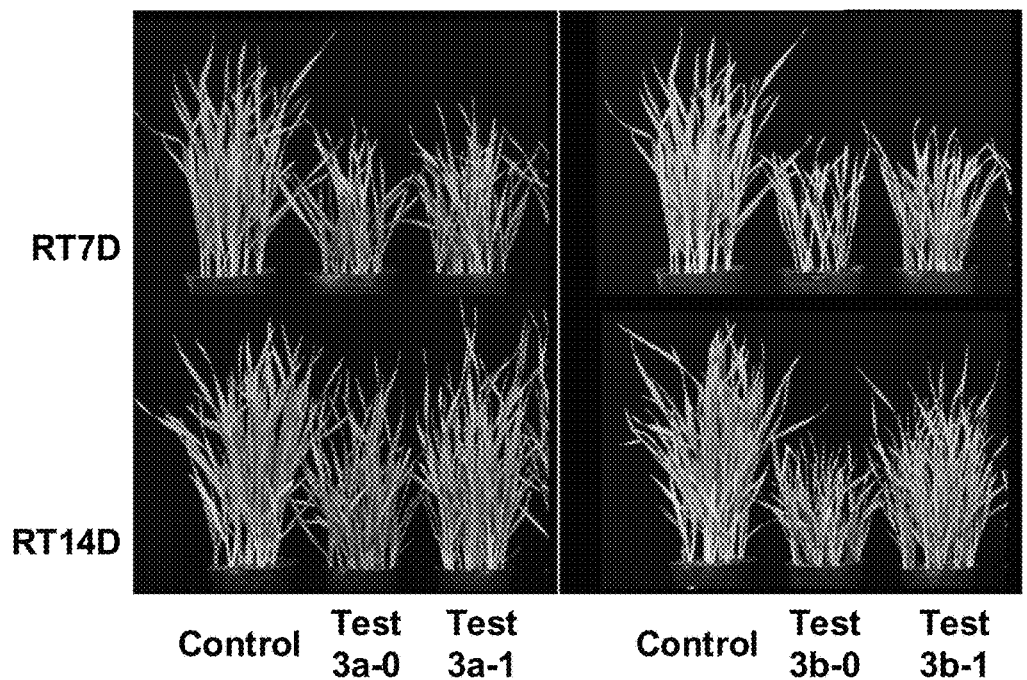
FIG. 11 shows phenotype observation of wheat plants treated with Metsulfuron methyl herbicide in Example 3. Wheat plants were applied with Metsulfuron methyl herbicide and placed under low-temperature stress (day/night temperature of 15/10° C.) for 5 days and then maintained at room temperature (RT, day/night temperature of 25/20° C.) for 14 days.
Figure 12:
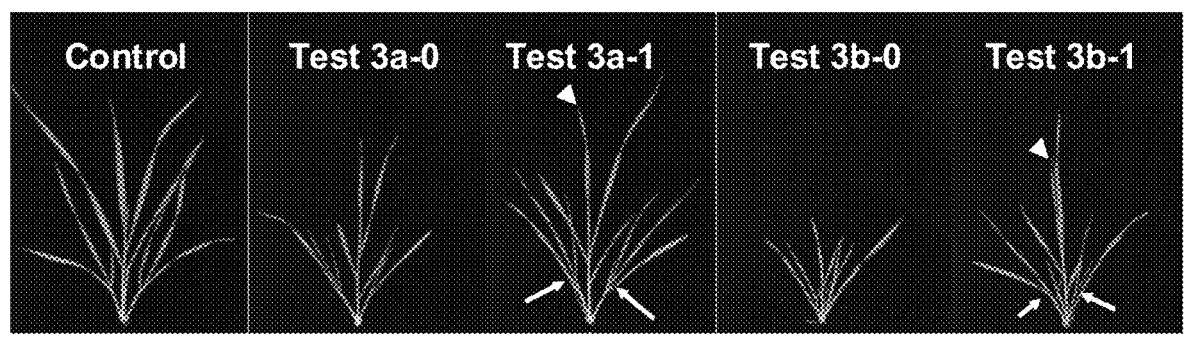
FIG. 12 shows phenotype observation of wheat leaves treated with Metsulfuron methyl herbicide in Example 3. The triangles indicate leaf growth, and the arrows indicate tiller growth.

As shown in FIGS. 11 and 12, metsulfuron methyl herbicide inhibits wheat shoot growth (Test groups 3a-0 and 3b-0). Wheat plants treated with metsulfuron methyl herbicide and the herbicide safener of the present invention (Test groups 3a-1 and 3b-1) show more leaf and tiller growth than wheat plants treated with metsulfuron methyl herbicide only (Test groups 3a-0 and 3b-0).

Figure 13:
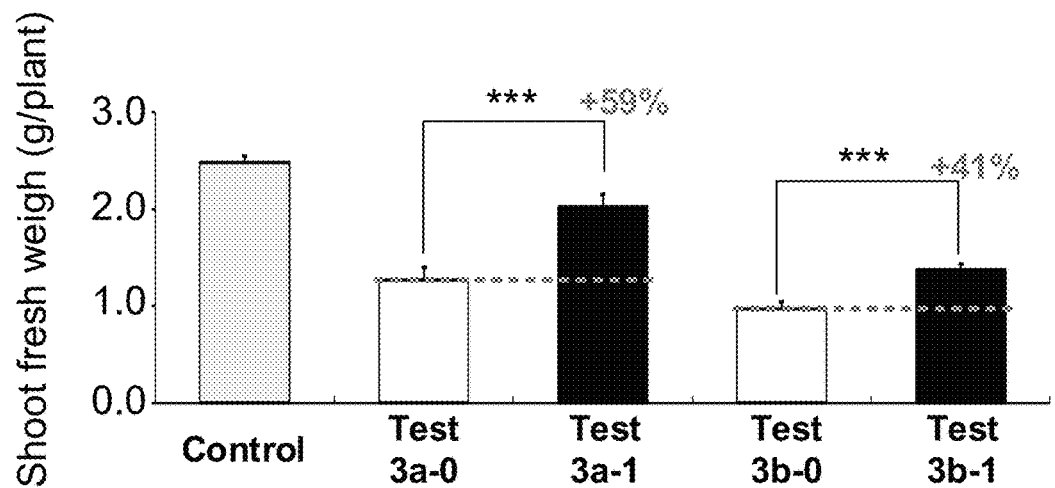
FIG. 13 shows the fresh weights of wheat shoots on the 14th day after returning the plants to RT in Example 3. The number above the bars of test group 3a-1 indicates the percentage increase compared to test group 3a-0. The number above the bars of test group 3b-1 indicates the percentage increase compared to test group 3b-0. *** p<0.001.

In addition, as shown in FIG. 13, after maintaining at RT for 14 days, the fresh weights of the wheat plants treated with 0.1 oz./acre metsulfuron methyl herbicide and the herbicide safener of the present invention (Test group 3a-1) are 59% significantly more than the fresh weights of the wheat plants treated with 0.1 oz./acre metsulfuron methyl herbicide only (Test group 3a-0) ($p<0.001$). Similarly, the wheat plants treated with 0.2 oz./acre metsulfuron methyl herbicide and the herbicide safener of the present invention (Test group 3b-1) have a 41% significant increase in fresh weight as compared with the wheat plants treated with 0.2 oz./acre metsulfuron methyl herbicide only (Test group 3b-0) ($p<0.001$).

Figure 14:
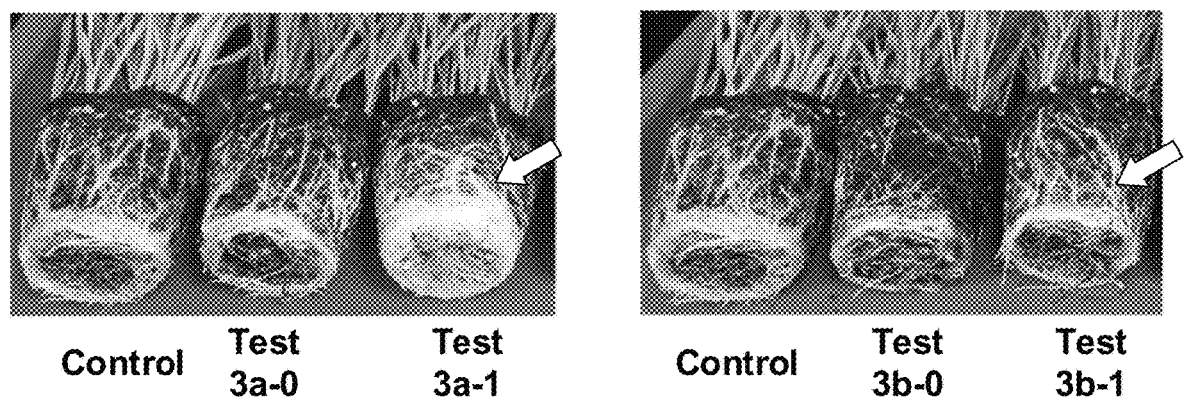
FIG. 14 shows phenotype observation of the roots of wheat plants on the 14th day after returning the plants to RT in Example 3. The arrows indicate root growth.

Furthermore, as shown in FIG. 14, compared with the Control group, metsulfuron methyl herbicide reduces the growth of the roots of the wheat plants (Test groups 3a-0 and 3b-0). Root growth of the wheat plants treated with metsulfuron methyl herbicide and the herbicide safener of the present invention (Test groups 3a-1 and 3b-1) increased as compared with the root growth of the wheat plants treated with metsulfuron methyl herbicide only (Test groups 3a-0 and 3b-0).

The results above indicate that the herbicide safener of the present invention alleviates the adverse effects of metsulfuron methyl herbicide to the leaves, shoots and roots of a non-target crop under low-temperature stress.

Example 4 Protection of Wheat Plants from the Damage Caused by Dicamba Herbicide 1. Preparation of Test Plants Wheat seeds (Taichung Sel. 2) were sown in pots containing culture medium (peat soil:vermiculite=3:1).

2. Plant Treatment

The wheat seeds were applied with the reagents listed in Table 6 once using a soil drench treatment before germination. A Dicamba herbicide (active ingredient: 48.2% (w/w) of dimethylamine salt of Dicamba (3,6-dichloro-o-anisic acid)) was used as the herbicide in this Example. A low dose (0.5 lb/acre) and a high dose (1.0 lb/acre) of Dicamba herbicide were applied to the wheat plants, respectively. The control group was treated with 0.1% (v/v) Tween® 80. The plants were grown under day/night temperature of 25/20° C., watered twice a week, and analyzed on the 14th day after the application.

TABLE 6

Summary of the reagents applied to wheat plants in Example 4.

| Group | Dicamba Herbicide (lb a.e./acre) | Glutamic Acid (mg/L) | Proline (mg/L) | GABA (mg/L) | Tween® 80 (%, v/v) |
|---|---|---|---|---|---|
| Control group | 0 | 0 | 0 | 0 | 0.1 |
| Test group 4a-0: Low dose herbicide | 0.5 | 0 | 0 | 0 | 0.1 |
| Test group 4a-1: Low dose herbicide + Formula 1 | 0.5 | 2.5 | 10 | 50 | 0.1 |
| Test group 4a-2: Low dose herbicide + Formula 2 | 0.5 | 5 | 25 | 100 | 0.1 |
| Test group 4b-0: High dose herbicide | 1.0 | 0 | 0 | 0 | 0.1 |
| Test group 4b-1: High dose herbicide + Formula 1 | 1.0 | 2.5 | 10 | 50 | 0.1 |
| Test group 4b-2: High dose herbicide + Formula 2 | 1.0 | 5 | 25 | 100 | 0.1 |

3. Analyses

Methods for analyzing leaves and roots and statistics are the same as described in Example 1.

4. Results

Figure 15:
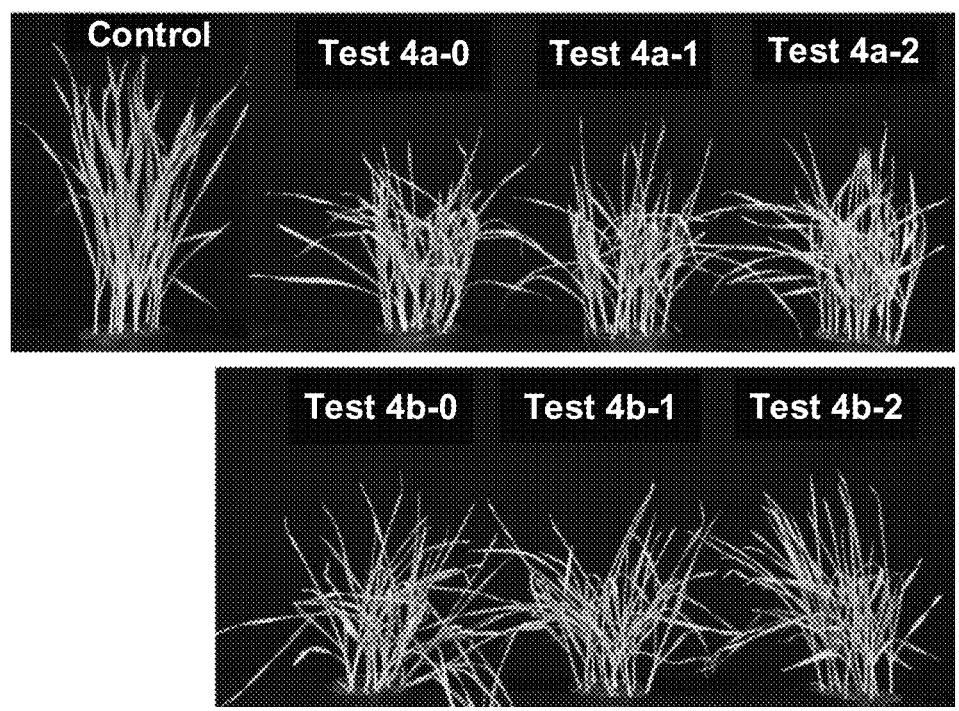
FIG. 15 shows phenotype observation of wheat plants on the 14$^{th}$ day after the application of Dicamba herbicide in Example 4.
Figure 16:
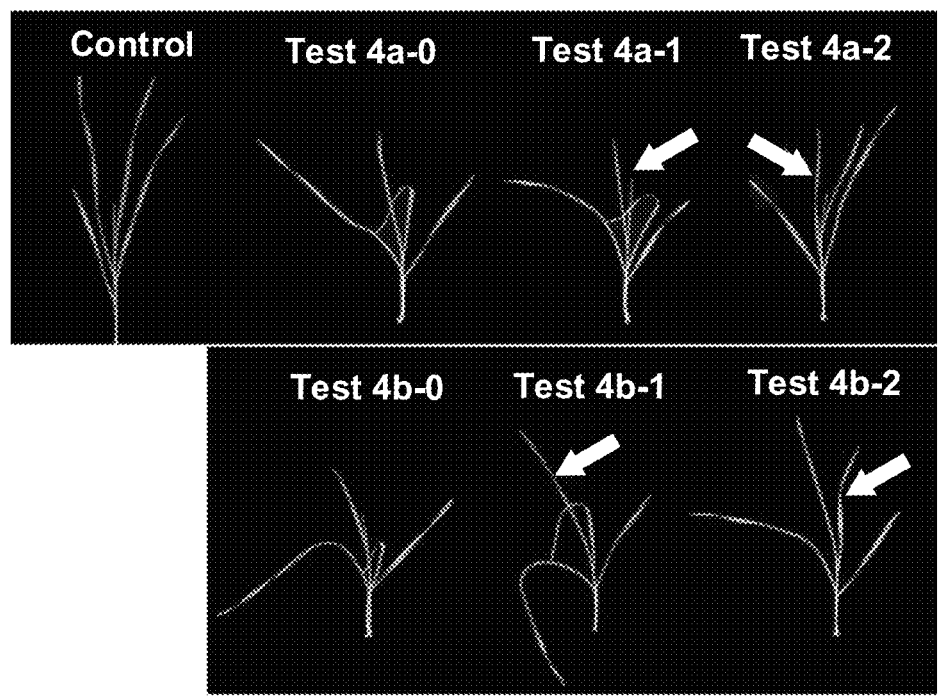
FIG. 16 shows phenotype observation of wheat leaves on the 14th day after the application of Dicamba herbicide in Example 4. Arrows indicate leaf emergence and leaf expansion.

As shown in FIGS. 15 and 16, Dicamba herbicide inhibits wheat leaf emergence and leaf expansion (Test groups 4a-0 and 4b-0). Wheat plants treated with Dicamba herbicide and the herbicide safener of the present invention (Test groups 4a-1, 4a-2, 4b-1, and 4b-2) shows more leaf emergence and leaf expansion than wheat plants treated with Dicamba herbicide only (Test groups 4a-0 and 4b-0).

Figure 17:
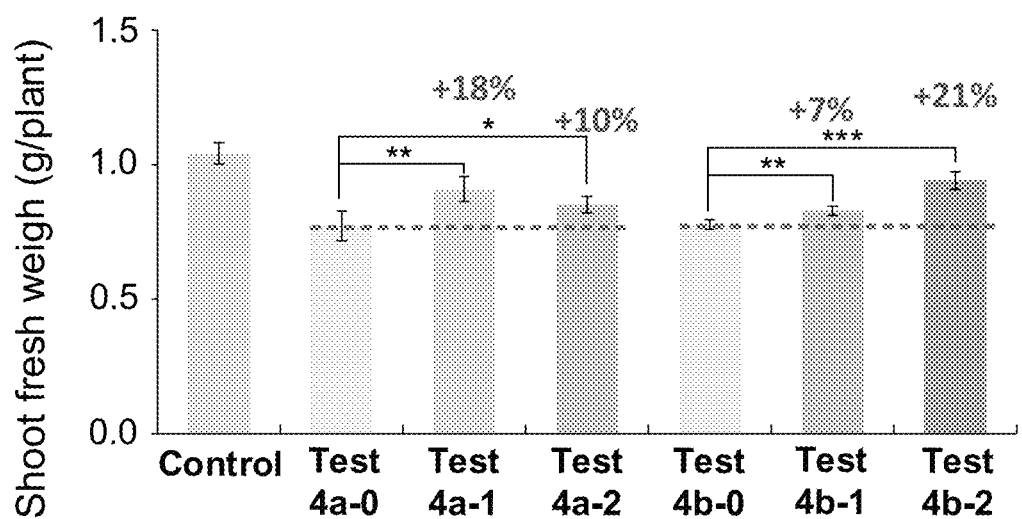
FIG. 17 shows the fresh weights of wheat shoots on the 14$^{th}$ day after the application of Dicamba herbicide in Example 4. The numbers above the bars of test groups 4a-1 and 4a-2 indicate the percentage increase compared to test group 4a-0. The numbers above the bars of test groups 4b-1 and 4b-2 indicate the percentage increase compared to test group 4b-0. * p<0.05, p<0.01, and * p<0.001.

In addition, as shown in FIG. 17, the fresh weights of the wheat plants treated with 0.5 lb/acre Dicamba herbicide and the herbicide safener of the present invention (Test groups 4a-1 and 4a-2) are 10% to 18% significantly more than the fresh weights of the wheat plants treated with 0.5 lb/acre Dicamba herbicide only (Test group 4a-0) ($p<0.01$ or $p<0.05$). Similarly, the wheat plants treated with 1.0 lb/acre Dicamba herbicide and the herbicide safener of the present invention (Test groups 4b-1 and 4b-2) have a 7% to 21% significant increase in fresh weight as compared with the wheat plants treated with 1.0 lb/acre Dicamba herbicide only (Test group 4b-0) ($p<0.01$ or $p<0.001$).

Figure 18:
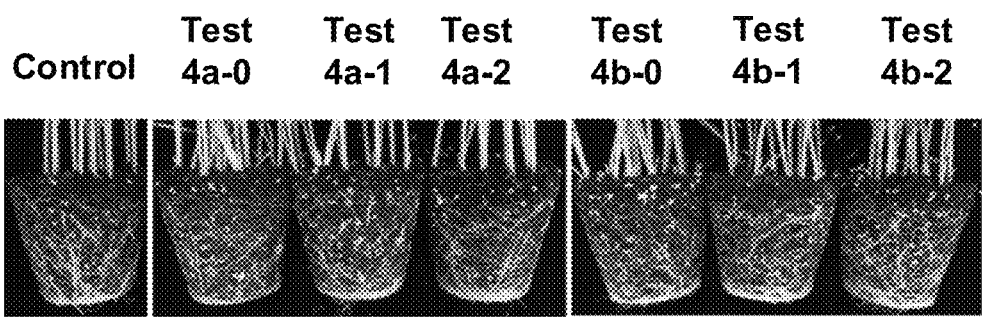
FIG. 18 shows phenotype observation of the roots of wheat plants on the 14th day after the application of Dicamba herbicide in Example 4.
Figure 19:
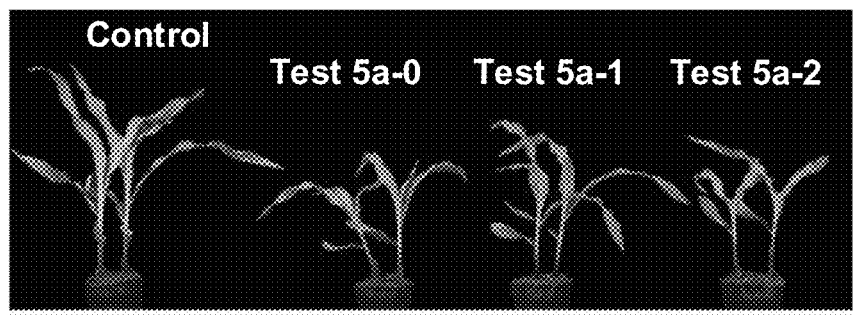
FIG. 19 shows phenotype observation of corn plants on the 14$^{th}$ day after the application of 2,4-D+Dicamba herbicide in Example 5.
Figure 20:
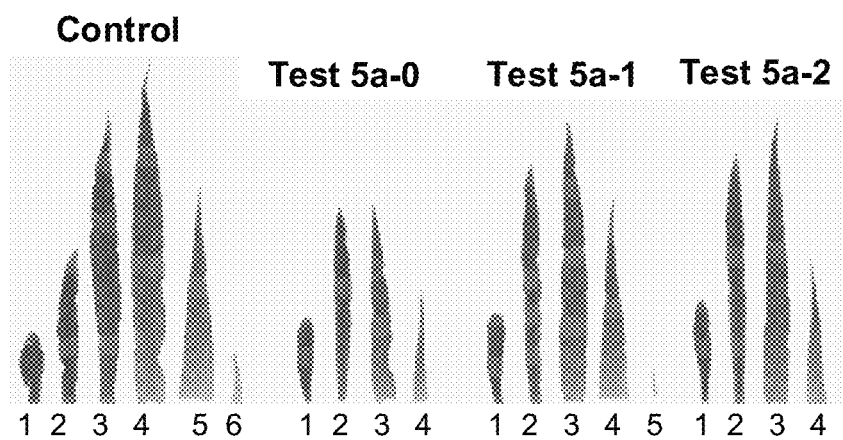
FIG. 20 shows phenotype observation of corn leaves on the 14$^{th}$ day after the application of 2,4-D+Dicamba herbicide in Example 5. The numbers indicate the order of leaf emergence.

Furthermore, as shown in FIG. 18, compared with the Control group, Dicamba herbicide reduces the growth of the roots of the wheat plants (Test groups 4a-0 and 4b-0). Root growth of the wheat plants treated with Dicamba herbicide and the herbicide safener of the present invention (Test groups 4a-1, 4a-2, 4b-1, and 4b-2) increased as compared with the root growth of the wheat plants treated with Dicamba herbicide only (Test groups 4a-0 and 4b-0).

The results above indicate that the herbicide safener of the present invention alleviates the adverse effects of Dicamba herbicide to the leaves, shoots and roots of a non-target crop.

Example 5 Protection of Corn Plants from the Damage Caused by 2,4-D+Dicamba Herbicide 1. Preparation of Test Plants Corn seeds (*Zea mays* 'White Pearl') were sown in pots containing culture medium (peat soil:vermiculite=3:1). The plants were grown under day/night temperature of 25/20° C.

2. Plant Treatment

The corn seeds were applied with the reagents listed in Table 7 once using a soil drench treatment before germination. A 2,4-D+Dicamba herbicide (active ingredient: 35.7% (w/w) of dimethylamine salt of 2,4-D and 12.4% (w/w) of dimethylamine salt of dicamba (3,6-dichloro-o-anisic acid)) was used as the herbicide in this Example. The control group was treated with 0.1% (v/v) Tween® 80. The plants were watered twice a week and analyzed on the 14th day after the application.

TABLE 7

Summary of the reagents applied to corn plants in Example 5.

| Group | 2,4-D + Dicamba Herbicide (pints/acre) | Glutamic Acid (mg/L) | Proline (mg/L) | GABA (mg/L) | Tween ® 80 (%, v/v) |
| --- | --- | --- | --- | --- | --- |
| Control group | 0 | 0 | 0 | 0 | 0.1 |
| Test group 5a-0: Herbicide | 0.625 | 0 | 0 | 0 | 0.1 |
| Test group 5a-1: Herbicide + Formula 1 | 0.625 | 2.5 | 10 | 50 | 0.1 |
| Test group 5a-2: Herbicide + Formula 2 | 0.625 | 5 | 25 | 100 | 0.1 |

3. Analyses

Methods for analyzing leaves and roots and statistics are the same as described in Example 1.

4. Results

As shown in FIGS. 19 and 20, 2,4-D+Dicamba herbicide inhibits corn leaf emergence and growth (Test group 5a-0). Corn plants treated with 2,4-D+Dicamba herbicide and the herbicide safener of the present invention (Test groups 5a-1 and 5a-2) shows more leaf emergence and growth than corn plants treated with 2,4-D+Dicamba herbicide only (Test groups 5a-0).

Figure 21:
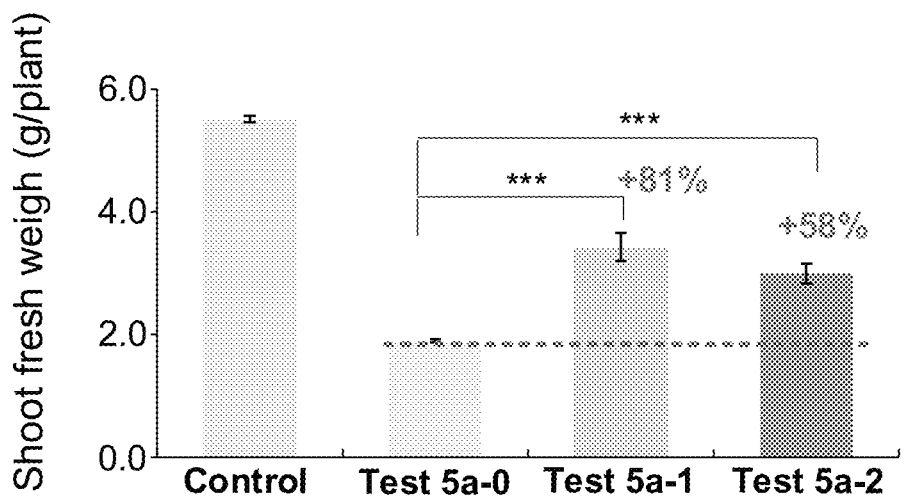
FIG. 21 shows the fresh weights of corn shoots on the 14$^{th}$ day after the application of 2,4-D+Dicamba herbicide in Example 5. The numbers above the bars of test groups 5a-1 and 5a-2 indicate the percentage increase compared to test group 5a-0. *** p<0.001.

In addition, as shown in FIG. 21, the fresh weights of the corn plants treated with 0.625 pints/acre 2,4-D+Dicamba herbicide and the herbicide safener of the present invention (Test groups 5a-1 and 5a-2) are 58% to 81% significantly more than the fresh weights of the corn plants treated with 0.625 pints/acre 2,4-D+Dicamba herbicide only (Test group 5a-0) ($p<0.001$).

Figure 22:
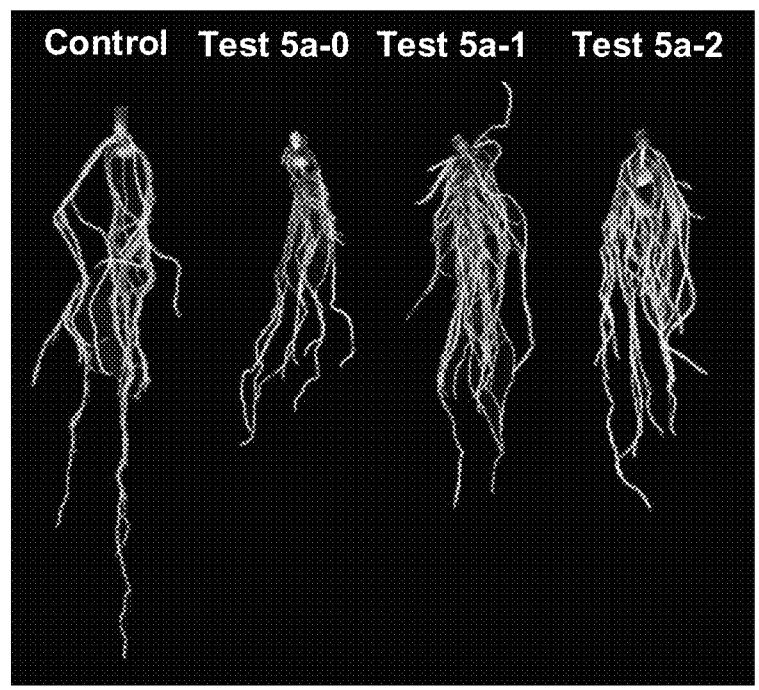
FIG. 22 shows phenotype observation of the roots of corn plants on the 14th day after the application of 2,4-D+Dicamba herbicide in Example 5.

Furthermore, as shown in FIG. 22, compared with the Control group, 2,4-D+Dicamba herbicide reduces the growth of the roots of the corn plants (Test group 5a-0). Root growth of the corn plants treated with 2,4-D+Dicamba herbicide and the herbicide safener of the present invention (Test groups 5a-1 and 5a-2) increased as compared with the root growth of the corn plants treated with 2,4-D+Dicamba herbicide only (Test group 5a-0).

Figure 23:
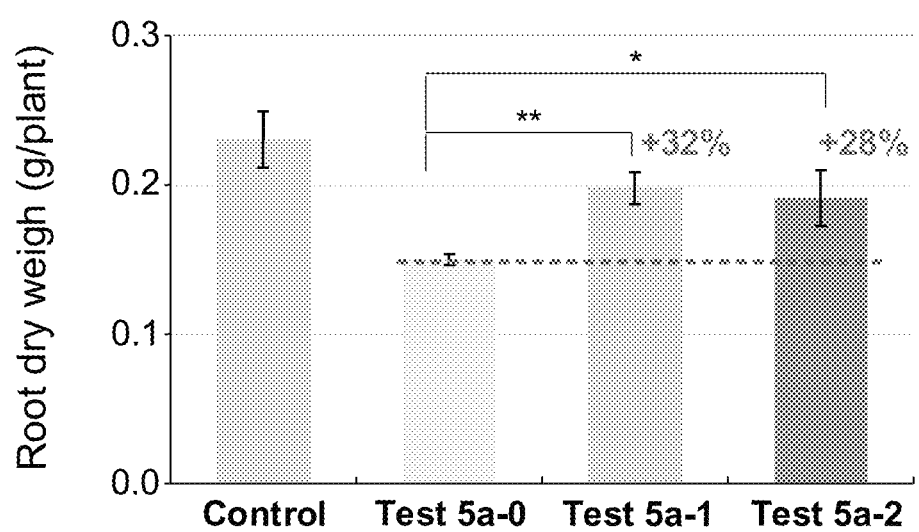
FIG. 23 shows the root dry weight of corn plants on the 14$^{th}$ day after the application of 2,4-D+Dicamba herbicide in Example 5. The numbers above the bars of test groups 5a-1 and 5a-2 indicate the percentage increase compared to test group 5a-0. * p<0.05 and ** p<0.01.

Similarly, as shown in FIG. 23, the root dry weights of the corn plants treated with 2,4-D+Dicamba herbicide only (Test group 5a-0) are much less than the root dry weight of the Control group. The root dry weights of the corn plants treated with 2,4-D+Dicamba herbicide and the herbicide safener of the present invention (Test groups 5a-1 and 5a-2) are 28% to 32% significantly more than the root dry weights of the corn plants treated with 2,4-D+Dicamba herbicide only (Test group 5a-0) ($p<0.01$ or $p<0.05$).

The results above indicate that the herbicide safener of the present invention alleviates the adverse effects of 2,4-D+Dicamba herbicide to the leaves, shoots and roots of a non-target crop. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A ready to use herbicide safener, consisting of
   between 0.5 to 25 mg/L glutamic acid;
   between 5 to 250 mg/L proline;
   between 20 to 500 mg/L GABA; and
   0.01-1% (v/v) of a drift control agent, wherein said drift control agent is a non-ionic surfactant.

2. A method for protecting a plant from
   damages caused by herbicides, comprising a step of applying a ready to use
   herbicide safener to the plant, and the ready to use herbicide safener consisting
   of
   between 0.5 to 25 mg/L glutamic acid;
   between 5 to 250 mg/L proline;
   between 20 to 500 mg/L gamma aminobutyric acid (GABA); and
   0.01-1% (v/v) of a drift control agent, wherein said drift control
   agent is a non-ionic surfactant.

3. The method of claim 2, wherein the ready to use herbicide safener is applied to the roots of the plant.

4. The method of claim 2, wherein the herbicide safener is applied to the foliage of the plant.

5. The method of claim 2, wherein the plant is a non-target plant of the herbicide.

6. The method of claim 2, wherein the ready to use herbicide safener is applied to the plant with the herbicide at the same time.

7. The method of claim 2, wherein the ready to use herbicide safener is applied to the plant after the application of the herbicide.

8. The method of claim 2, wherein the ready to use herbicide safener is applied to the plant before the application of the herbicide.

* * * * *